United States Patent Office 3,457,229
Patented July 22, 1969

3,457,229
COPOLYMERS OF TRIOXANE, CYCLIC ETHERS AND TRIFUNCTIONAL COMPOUNDS AND PROCESS FOR THEIR MANUFACTURE
Edgar Fischer, Frankfurt am Main, and Claus Schott, Hofheim, Taunus, Germany, assignors to Farbwerke Hoechst Aktiengesellschaft vormals Meister Lucius & Bruning, Frankfurt am Main, Germany, a corporation of Germany
No Drawing. Filed June 28, 1966, Ser. No. 561,036
Claims priority, application Germany, July 10, 1965, F 46,566
Int. Cl. C08g 1/16
U.S. Cl. 260—67                3 Claims

ABSTRACT OF THE DISCLOSURE

Copolymers of trioxane and bis-alkyltriol-triformals of the following formula:

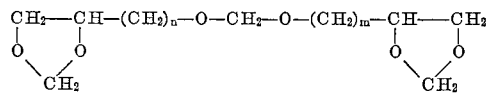

in which $n$ and $m$ are integers within the range of 3 to 9, advantageously 3 or 4, are disclosed. The mixture of monomers used in preparing the copolymers may contain from 98 to 80% by weight of trioxane, 0.1 to 10% by weight of bis-alkyltriol-triformal and optionally up to 10% by weight of a cyclic ether. Polymerization is effected in the presence of a cationic catalyst at a temperature of —50° to 100° C. The copolymers are especially useful in the injection molding of articles having a large area, as well as in the manufacture of sheets, films and fibers.

---

The present invention relates to copolyacetals obtained from trioxane, cyclic ethers and bisalkyltriol triformals, and a process for making them.

It is known that high molecular weight polymers containing recurring oxymethylene units can be obtained by polymerization of formaldehyde or trioxane. According to another known method, heat resistant polyacetals are obtained by copolymerizing trioxane with saturated cyclic ethers, for example, glycol formal or ethylene oxide. Such products are predominantly used for injection molding. It has further been proposed to make copolymers of trioxane, cyclic ethers and compounds containing two polymerizable groups. These known compounds, however, tend to cross-link the copolymers whereby infusible products are obtained.

It has already been proposed to make terpolymers of improved flow from trioxane, cyclic ethers and alkyl glycidyl formals or polyglycol diglycidyl ethers. It has also been proposed to make copolymers of formaldehyde and methylene-bis-(4-oxymethyl-1,3-dioxolane).

Now we have found that copolymers of trioxane, cyclic ethers and compounds having a trifunctional behavior on polymerization can be obtained in an advantageous manner by polymerizing mixtures of 98 to 80% by weight of trioxane, 0 to 10% by weight of a cyclic ether and 0.1 to 10% by weight of a bis-alkyltriol-triformal of the following formula

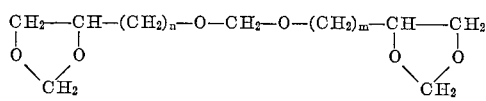

in which $n$ and $m$ are integers within the range of 3 to 9, advantageously 3 or 4.

The cyclic ethers preferably used are, for example of the following formula

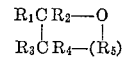

in which $R_1$ to $R_4$ represent hydrogen atoms or alkyl radicals which may be substituted by halogen atoms and $R_5$ stands for a methylene radical or oxymethylene radical which methylene or oxymethylene radical may be substituted by an alkyl or haloalkyl group and $x$ is zero or an integer within the range of 1 to 3, or $R_5$ is the grouping —($O$—$CH_2$—$CH_2$)$_y$—$OCH_2$— and $x$ is 1 and $y$ is an integer within the range of 1 to 3. The above mentioned alkyl groups have 1 to 5 carbon atoms and may be substituted by 0 to 3 halogen atoms, advantageously chlorine atoms.

As cyclic ethers it is particularly advantageous to use ethylene oxide, glycol formal and diglycol formal. There may also be used, for example, propylene oxide, epichlorhydrin and 4-chloromethyl dioxolane. Cyclic ethers are advantageously used if the bis-alkyltrioltriformal is used in an amount of less than 2%.

As bis-alkyltrioltriformals there may be used compounds having a linear and two cyclic formal groups, for example, bis-1,2,5-pentanetrioltriformal, and advantageously bis-1,2,6-hexanetrioltriformal. The bis-alkyltrioltriformals are advantageously used in an amount within the range of 1 to 8% by weight.

The copolymers obtained by the process of the invention are distinguished by a considerably improved flow of the polymer melt, a property which is of decisive importance particularly in the manufacture of injection molded articles having large surfaces.

The polymerization may be carried out according to known methods, i.e. in substance, solution or suspension. As solvents it is advantageous to use inert aliphatic or aromatic hydrocarbons, halogenated hydrocarbons or ethers. The polymerization in bulk takes a particularly smooth course. Depending on the solvent used, the polymerization is carried out at a temperature within the range of —50° to +100° C.

The polymerization is initiated by known cationic catalysts. Examples of suitable catalysts are organic or inorganic acids, acid halides and particularly Lewis acids (cf. Kortüm, Lehrbuch der Elektrochemie, Wiesbaden 1948, pages 300 and 301), preferably boron fluoride and its complex compounds, for example boron fluoride etherates. It is particularly advantageous to use the diazonium fluoroborates disclosed in Belgian Patents Nos. 593,648 and 618,213 and the compounds described in Belgian Patent No. 585,980.

The concentration of the catalyst may vary within wide limits. It depends on the nature of the catalyst and the desired molecular weight of the polymer. The concentration of the catalyst may be within the range of from 0.0001 to 1%, advantageously 0.001 to 0.1%, calculated on the weight of the monomer mixture.

Since the catalysts to be used in the process of the invention tend to decompose the polymer, they are advantageously made ineffective immediately after the polymerization, for example with the help of ammonia or amine solutions.

The removal of unstable terminal semi-acetal groups is carried out in the manner known for other copolymers. Advantageously, the polymer is suspended in aqueous ammonia at temperatures within the range of from 100° to 200° C., in the presence of a swelling agent such as methanol or n-propanol, if desired. It is also possible to dissolve the polymer in a medium having an alkaline reaction at temperatures above 100° C. and then to reprecipitate it. As solvents, there may be used benzyl alcohol, ethylene glycol monoethyl ether or a mixture of 60% methanol and 40% water. As compounds having an alkaline reaction, ammonia or aliphatic amines may be used.

The stabilization of the polymer against heat, light and oxygen may be carried out in the manner known for other trioxane co- and terpolymers. Examples of suitable heat stabilizers are polyamides, amides of polybasic carboxylic acids, amidines and urea compounds. Exemplary of oxidation stabilizers are phenols, particularly bisphenols and aromatic amines. Suitable light stabilizers are α-oxybenzophenone derivatives.

The copolymers obtained by the process of the invention can advantageously be used for the manufacture of large-area articles by injection molding, for extrusion processes and for the manufacture of sheets, films and fibers.

The following examples serve to illustrate the invention but are not intended to limit it.

Example 1

100 g. of trioxane, 2 g. of ethylene oxide and 8 g. of bis-1,2,6-hexanetrioltriformal were polymerized in a screw-top glass bottle in the presence of 15 mg. of p-nitrophenyl diazonium fluoroborate as the catalyst at a thermostat temperature of 70° C. After the polymerization had been terminated, the block of polymer was comminuted, ground and then homogeneously hydrolysed for 30 minutes at 150° C. in 1 liter of benzyl alcohol in the presence of 10 cc. of triethanolamine. After hydrolysis the product was boiled with methanol, washed and dried. The melt index according to ASTM-D 1238-52 T was $i_2=13$ and $i_{20}=23\,600$. The ratio $i_{20}/i_2$, as a measure of the melt rheology, was 182.

Example 2

In the manner described in Example 1, 100 g. of trioxane and 5 g. of bis-1,2,5-pentanetrioltriformal were polymerized in the presence of 10 mg. of p-nitrophenyl diazonium fluoroborate as the catalyst and hydrolysed. The melt index was $i_2=7.6$ and $i_{20}=1667$. The ratio $i_{20}/i_2$ was 219.

Comparison example 100 g. of trioxane, 2 g. of ethylene oxide and 5 g. of 1,4-butanediol diglycidyl ether were polymerized in the presence of 15 mg. of p-nitrophenyl diazonium fluoroborate as described in Example 1. Since the product was insoluble it could not be hydrolysed in benzyl alcohol. The product was moreover infusible so that no melt index could be measured. Since the product could obviously not be processed, it was of no technical interest.

Fusible terpolymers based on butanediol diglycidyl ether with lower concentrations of termonomer, which had been adjusted with regulators to a viscosity suitable for injection molding, showed ratios of $i_{20}/i_2$ of below 30.

For extrusion types the said ratio was below 50.

We claim:

1. A process for the manufacture of copolymers of trioxane and cyclic ethers which comprises polymerizing a mixture of 98 to 80% by weight of trioxane, 0 to 10% by weight of an oxygen-containing cyclic ether of the formula

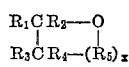

in which $R_1$ to $R_4$ represent hydrogen atoms or alkyl radicals of 1–5 carbon atoms which may be substituted by 1 to 3 halogen atoms and $R_5$ stands for a methylene radical or oxymethylene radical which methylene or oxymethylene radical may be substituted by an alkyl of 1–5 carbon atoms or haloalkyl group and $x$ is an integer of 0 to 3, or $R_5$ is the grouping —(O—CH$_2$—CH$_2$)$_y$—OCH$_2$— and $x$ is 1 and $y$ is an integer from 1 to 3 and 0.1 to 10% by weight of a bis-alkyltrioltriformal of the following formula

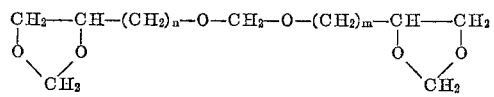

in which $n$ and $m$ are integers within the range of from 3 to 9, in the presence of a cationic catalyst at a temperature within the range —50° to 100° C.

2. A process for the manufacture of copolymers of trioxane and cyclic ethers which comprises polymerizing a mixture of 98 to 80% by weight of trioxane, 0 to 10% by weight of an oxygen-containing cyclic ether of the formula

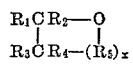

in which $R_1$ to $R_4$ represent hydrogen atoms or alkyl radicals of 1–5 carbon atoms which may be substituted by 1 to 3 halogen atoms and $R_5$ stands for a methylene radical or oxymethylene radical which methylene or oxymethylene radical may be substituted by an alkyl of 1–5 carbon atoms or haloalkyl group and $x$ is an integer of 0 to 3, or $R_5$ is the grouping —(O—CH$_2$—CH$_2$)$_y$—OCH$_2$— and $x$ is 1 and $y$ is an integer from 1 to 3 and 0.1 to 10% by weight of a bis-alkyltrioltriformal of the following formula

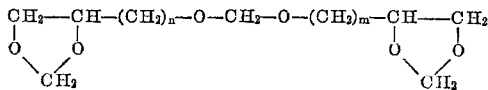

in which $n$ and $m$ are 3 or 4, in the presence of a cationic catalyst at a temperature within the range —50° to 100° C.

3. A copolyacetal essentially composed of units derived from 98 to 80% by weight of trioxane, 0 to 10% by weight of an oxygen-containing cyclic ether of the formula

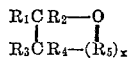

in which $R_1$ to $R_4$ represent hydrogen atoms or alkyl radicals of 1–5 carbon atoms which may be substituted by 1 to 3 halogen atoms and $R_5$ stands for a methylene radical or oxymethylene radical which methylene or oxymethylene radical may be substituted by an alkyl of 1–5 carbon atoms or haloalkyl group and $x$ is an integer of 0 to 3, or $R_5$ is the grouping —(O—CH$_2$—CH$_2$)$_y$—OCH$_2$— and $x$ is 1 and $y$ is an integer from 1 to 3 and 0.1 to 10% by weight of a bis-alkyltrioltriformal of the formula

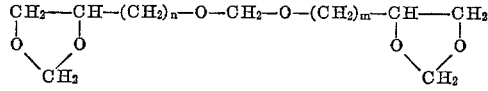

in which $n$ and $m$ are 3 to 9.

References Cited

UNITED STATES PATENTS 3,293,219  12/1966  Gottesman et al.

WILLIAM H. SHORT, Primary Examiner

L. M. PHYNES, Assistant Examiner

U.S. Cl. X.R.

260—45.8, 45.9, 45.95